No. 11,650.   PATENTED SEPT. 5, 1854.
J. MORSS.
DRIVING WHEEL FOR LOCOMOTIVES FOR ASCENDING INCLINED PLANES, &c.

UNITED STATES PATENT OFFICE.

JOSEPHINE MORSS, OF WASHINGTON, DISTRICT OF COLUMBIA.

DRIVING-WHEEL OF LOCOMOTIVES FOR ASCENDING INCLINED PLANES.

Specification of Letters Patent No. 11,650, dated September 5, 1854.

*To all whom it may concern:*

Be it known that I, JOSEPHINE MORSS, of the city of Washington, in the District of Columbia, have invented certain new and useful Improvements in Driving-Wheels of Locomotive-Engines and the Track upon which They Run; and I hereby declare that the following is a full, clear, and exact description thereof, reference being had to the accompanying drawings, making part of this specification, and to the letters of reference thereon, which indicate the same parts in the different figures.

The nature of my invention consists in the use or employment of elliptic driving wheels on locomotive engines in connection with curved rails constructed and arranged as will be presently shown, by means of which a locomotive of sufficient power is enabled to draw a much greater load up a much steeper grade than it can overcome upon the usual plan without reference to its weight, or vertical pressure upon the track.

I construct a pair of driving wheels ($a$) of suitable dimensions in the form of oblique sections of cylinders and fix them upon an axle ($b$) of any of the usual forms, with their transverse axes inclined toward each other in the angle of the obliquity of the section. They are made with flanges projecting at right angles to their cylindrical surfaces on both sides forming grooves or channels which fit upon the rails $c$ which are made of a size, and shape in their transverse section to correspond therewith.

The track to be used in connection with the above described wheels is composed of the rails $c$, laid in a substantial manner (and suitably tied, and braced) in the same plane, but curved laterally, alternately approaching, and receding from each other, and corresponding precisely with tracks made by the wheels $a$, arranged as before mentioned, and revolved upon a plane surface.

Figure 3:
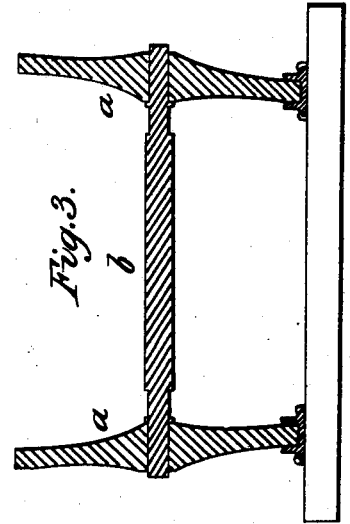
Figure 1:
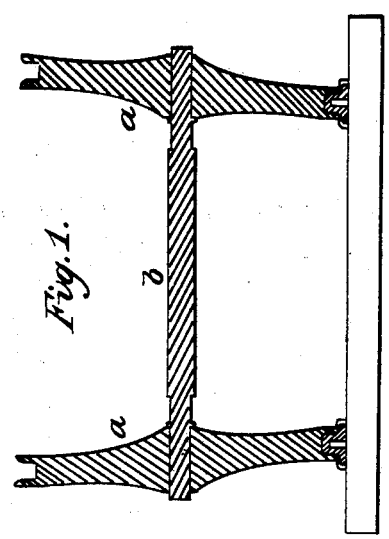
Figure 2:
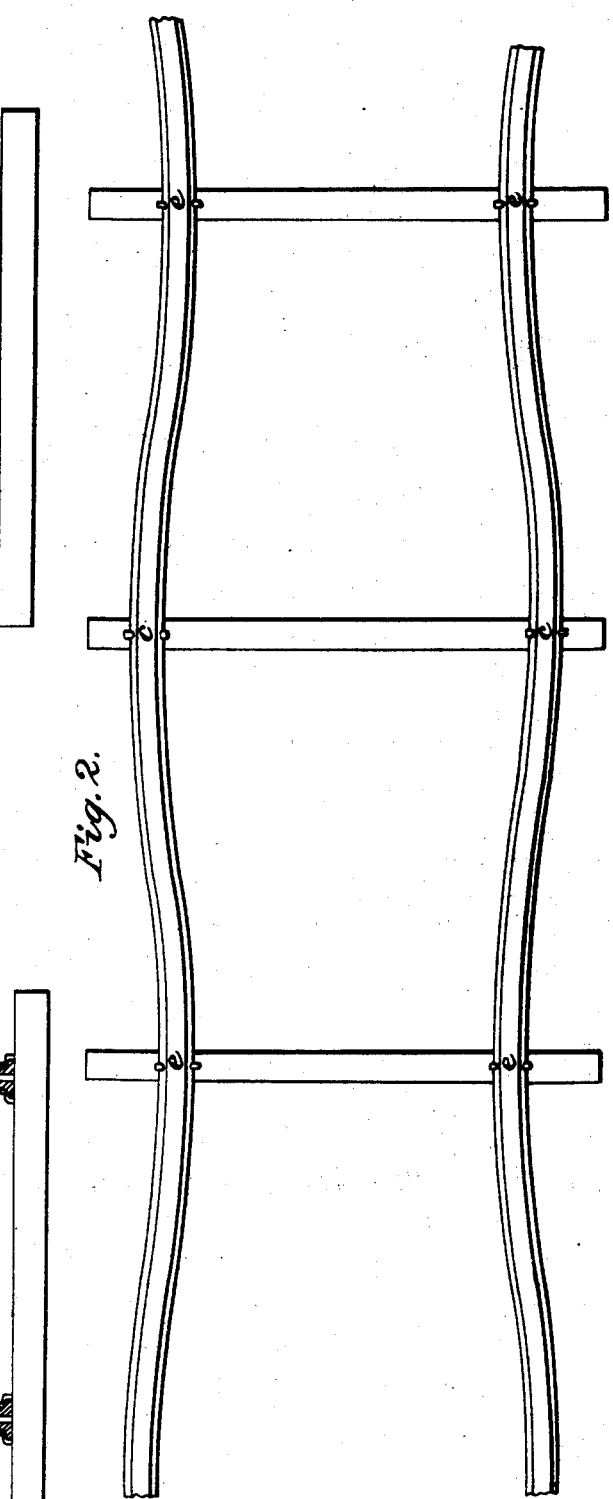

Figure 1 is a section of a pair of driving wheels, and axle upon my plan. Fig. 2 is a ground plan of the track, and Fig. 3 is a modification of the wheels and axle.

A locomotive engine with driving wheels constructed and arranged as above described, with either inside or outside bearings, being placed with its bearing wheels upon a common track with parallel rails either inside or outside of the curved or waving rails $c$, and the wheels $a$ with those parts of their peripheries which are nearest to one-another resting upon the points $e$ upon the rails $c$ where they approach each other most nearly, and power being applied it is obvious that the wheels cannot revolve in that place without bending themselves or the axle or spreading the rails, but assuming that they are all sufficiently strong and that sufficient power is used, they have no alternative but to advance whatever may be the load or whatever may be the grade (within reasonable limits).

If the brakes are applied, and the wheels $a$, prevented from revolving when the train is stopped upon an inclined plane they cannot slip back upon the track, though it may be very slippery from any cause. A train so heavy as to overcome the adhesion of the common driving wheels can be started with facility if sufficient power be applied upon my plan. A modification as shown in Fig. 3 may be found desirable in practice, the wheels are there made without flanges and are intended to run in gutter shaped rails.

Powerful locomotives upon my plan may be used exclusively upon inclined planes, to draw up the trains upon the common track, or the inclined wheels can be used in conjunction with the common ones, the former to be brought into use only in ascending grades where the curved track may be laid, or the curved track may be continued the whole length of the road and the inclined wheels will draw immense loads with ease and economy.

I do not describe in detail the various clutches, stops, &c., and their combinations, that may be necessary in carrying out the various modifications of my improvement for such I do not claim. But

What I claim as my invention and desire to secure by Letters Patent is—

The use or employment of inclined driving wheels upon locomotive engines, or their equivalents in combination with the curved rails $c$, constructed and arranged substantially as described, and for the purposes specified.

JOSEPHINE MORSS.

Witnesses:
SAML. GRUBB,
J. AMORY.